United States Patent [19]
Martinitz

[11] Patent Number: 5,590,678
[45] Date of Patent: Jan. 7, 1997

[54] DEVICE FOR THE DISPOSAL OF LIQUID MEDIA

[75] Inventor: Hans-Peter Martinitz, Kuchen, Germany

[73] Assignee: F & F Filter- Und Fordertechnik GmbH, Ostfildern, Germany

[21] Appl. No.: 511,233

[22] Filed: Aug. 4, 1995

[30] Foreign Application Priority Data

Aug. 31, 1994 [DE] Germany .......................... 44 30 959.7
Jan. 23, 1995 [DE] Germany ......................... 19 501 921.0

[51] Int. Cl.$^6$ ....................................................... F04F 3/00
[52] U.S. Cl. ........................... 137/205; 137/567; 137/571; 184/6.14; 210/168
[58] Field of Search .................................. 137/205, 567, 137/571, 582; 184/6.14; 210/168

[56] References Cited

U.S. PATENT DOCUMENTS

| | | | |
|---|---|---|---|
| 420,052 | 1/1890 | Glennan et al. | 137/205 X |
| 2,945,445 | 7/1960 | Smith et al. | 137/567 X |
| 3,599,639 | 8/1971 | Spotz | 137/205 X |
| 4,325,663 | 4/1982 | Lee | 210/168 X |
| 5,223,156 | 6/1993 | Maier | 137/571 X |
| 5,380,446 | 1/1995 | Bratten | 210/805 |
| 5,466,380 | 11/1995 | Bratten | 184/6.14 X |

FOREIGN PATENT DOCUMENTS

0593005A1  4/1994  European Pat. Off. .

*Primary Examiner*—Gerald A. Michalsky
*Attorney, Agent, or Firm*—Evenson Mckeown Edwards & Lenahan, PLLC

[57] ABSTRACT

A system is provided for disposing of coolant/lubricant liquids containing production residue returned in gutters or the pipe lines to a collection space. A pressure resistant reservoir is provided with a liquid media inlet pipe opening into an upper reservoir area. The liquid media is sucked into the reservoir by an evacuation device connected to an upper reservoir area. The liquid media is fed from the bottom of the reservoir to a downstream collecting tank by means of a return pump. By sucking the liquid media into an upper area of the pressure resistant reservoir, the reservoir can be disposed above ground level while the gutters and collection space are disposed near or below ground level.

11 Claims, 3 Drawing Sheets

5,590,678

DEVICE FOR THE DISPOSAL OF LIQUID MEDIA

BACKGROUND AND SUMMARY OF THE INVENTION

The invention relates to a device or system for the disposal of liquid media, such as cooling-lubricating liquids containing production residue, such as chips from industrial processes, wherein these media can be returned via gutters and/or pipe lines to a return reservoir disposed above ground level and from there through a pipe line connected near the bottom to at least one collecting tank by means of at least one return pump.

In a known device of this type (EP Patent Publication EP 0 593 005 A1) the medium with production residue to be disposed of flows to the return reservoir from the collection place, which requires that the collection place be located sufficiently far above the ground level. However, it is often not possible to comply with this requirement in connection with production machinery wherein the liquid medium with the production residue runs off toward the bottom.

It is therefore an object of the invention to make feeding of the liquid media with production residue into the return reservoir possible even if the collection place is located below or only slightly above the ground level, so that an inflow into the return reservoir above ground level is not possible.

This object is attained according to preferred embodiments of the invention in a device of the type mentioned at the outset, in that the media can be fed from the collection place (s), guided through a gutter to a pipe line connected to the upper area of the return reservoir, which is made pressure-resistant and whose interior can be placed under reduced pressure by means of an evacuating device also connected to its upper area, and that at least one device which detects the level in the return reservoir and which has at least one switch element is provided in the return reservoir.

Because of the suction effect produced via the pipe line it is possible to dispose the gutter below or immediately above the ground level, so that the liquid media with the production residue can flow into the gutter.

A pressure-reducing valve inserted between the return reservoir and the evacuating device is used to protect the return reservoir in certain preferred embodiments of the invention.

In certain preferred embodiments of the invention, a filter is connected downstream of the evacuating device for protecting the environment from contaminants which are carried along.

The evacuating device can be advantageously designed as a bypass channel compressor or rotary piston blower or liquid vacuum pump according to various contemplated embodiments of the invention.

To allow an exact control of the return pump(s) as a function of the respective level of the media in the return reservoir, the device detecting the level of the media can have several switch elements reacting to different positions of the level according to certain preferred embodiments of the invention.

To allow a more exact adaptation of the conveyance to the collecting tank as a function of the amount of media generated, two pipe lines leading to the collecting tank, each containing a return pump, can be connected to the area near the bottom of the return reservoir, according to certain preferred embodiments of the invention.

The disposal of liquid media can also be simplified by means of a device of the type described, if the media originate in different collection places where liquid media with production residue are not necessarily collected simultaneously, according to certain preferred embodiments of the invention. For example, this is the case if the collection places are associated with different processing machines which can be operating simultaneously or individually.

This last mentioned feature can be achieved according to certain preferred embodiments of the invention in that several return reservoirs with upstream gutters and upstream pipe lines and downstream return pumps as well as devices detecting the level are provided, that an intermediate reservoir is respectively placed between the gutter and the pipe line, that the several return reservoirs are connected parallel to a single evacuating device, that a switchable closing valve is inserted into each pipe line connecting a return reservoir with the evacuating device and that a device detecting the level in each intermediate reservoir with at least one switch element is provided in each intermediate reservoir.

In case that large-grained production residue, which cannot be pumped, is expected, a comminuting device for large-grained production residue can be placed upstream of each intermediate reservoir, according to certain preferred embodiments of the invention.

The operation of the systems of the invention should be controlled in such a way that when liquid media with production residue occur in at least one collection place, for example if one of the associated processing machines is operating, the evacuating device is constantly operating. In this case the activation of the evacuating device can be triggered in that the switch element of a device detecting the level in an intermediate reservoir reacts to the liquid media with production residue collected in this intermediate reservoir. This reaction of the switch element can also trigger the opening of the closing valve which has been shut up to that time and is located in the pipe line connecting the associated return reservoir with the evacuating device. In this case the closing valves in the pipe lines between the other return reservoirs and the evacuating device remain closed and are only opened when the switch elements for the devices for detecting the level in the other intermediate reservoirs react. The closing valves are correspondingly shut again when the level in the intermediate reservoirs has been lowered sufficiently far that the switch elements no longer react.

The return pumps are correspondingly activated when a switch element disposed in the upstream connected return reservoir for detecting the level is actuated, and they are shut down again when a switch element of this device no longer reacts.

The switching process of closing the switch valves and the shut-off of the return pumps is triggered with different run-on times, so that the intermediate reservoirs and the return reservoirs are completely emptied or at least emptied as much as possible.

Other objects, advantages and novel features of the present invention will become apparent from the following detailed description of the invention when considered in conjunction with the accompanying drawings.

DETAILED DESCRIPTION OF THE DRAWINGS

Figure 1:
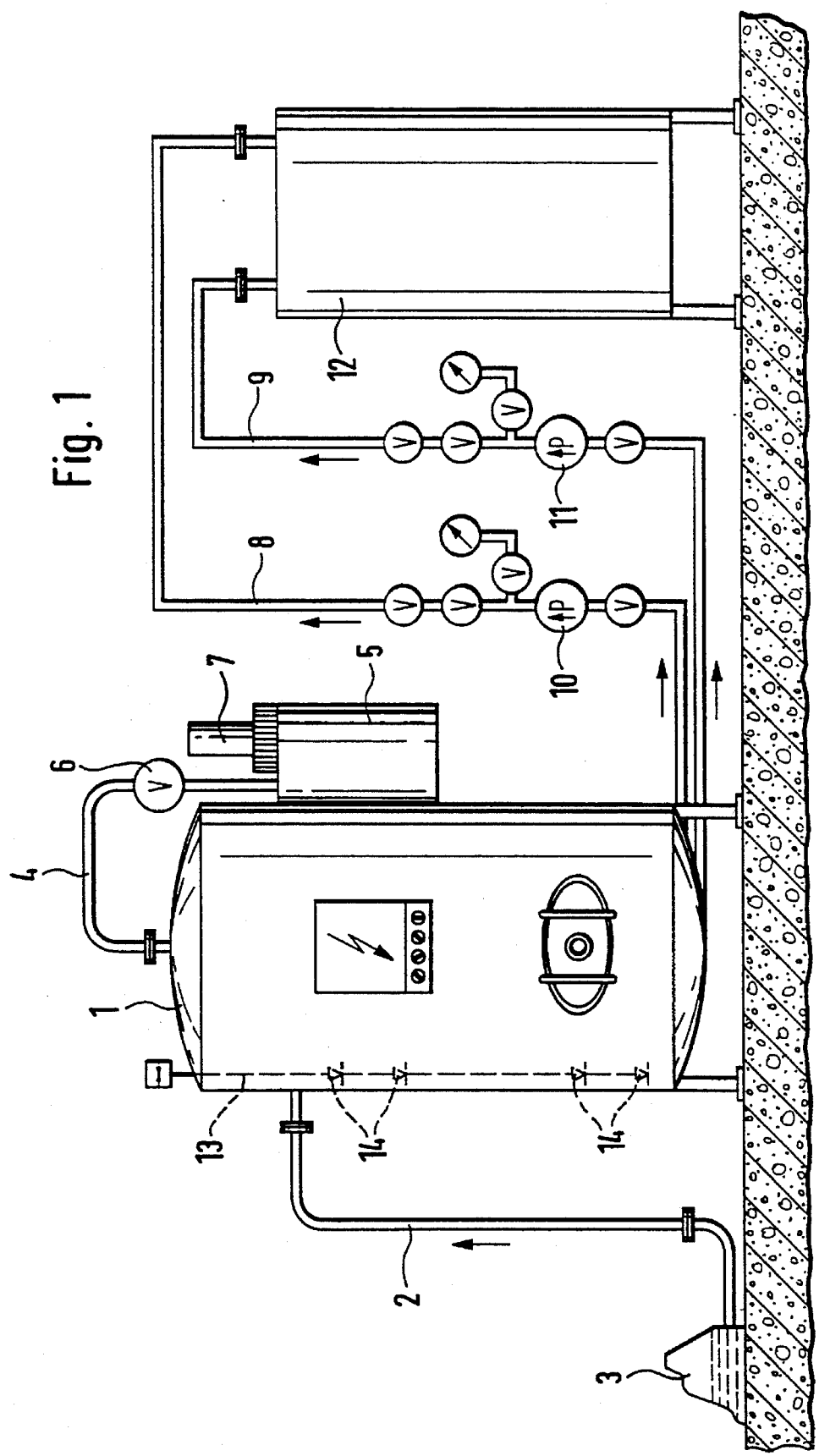
FIG. 1 is a lateral schematic view of a system for the disposal of liquid media with one return reservoir, constructed according to a preferred embodiment of the invention.

A pipe line 2 is connected to the upper area of a return reservoir 1 placed above the ground level and provides a connection with a gutter 3 through which liquid media with production residue, which are to be disposed, are supplied. For example, the liquid media may be lubricant-coolant from a machine tool, such as a lathe, containing production residue in the form of metal chips from the lathe cutting process. The liquid media is filtered upstream of the pipe line 2.

A further pipe line 4 is connected with the upper area of the return reservoir t and leads to an evacuating device 5. A pressure-limiting valve 6 is inserted into this pipe line 4. A filter 7 is connected downstream of the evacuating device 5.

Figure 3:
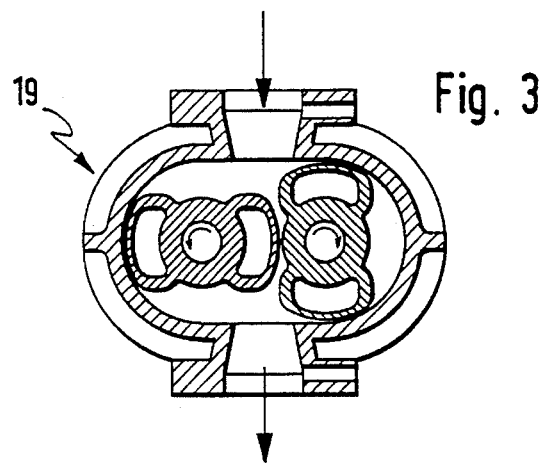
FIG. 3 is a sectional view of a rotary piston blower for use with the system of FIGS. 1 and 2.

FIG. 3 schematically depicts a section of a rotary piston blower 19 that is used as the evacuating device 5 in certain preferred embodiments of the invention.

Figure 4:
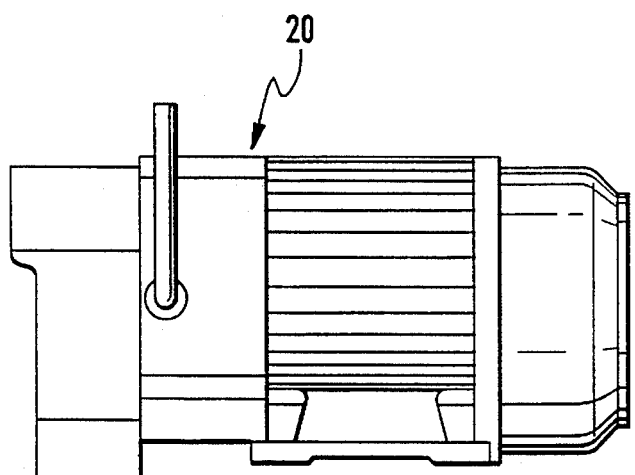
FIG. 4 is a lateral, schematic view of a liquid ring vacuum pump for use with the systems of FIGS. 1 and 2.
Figure 5:
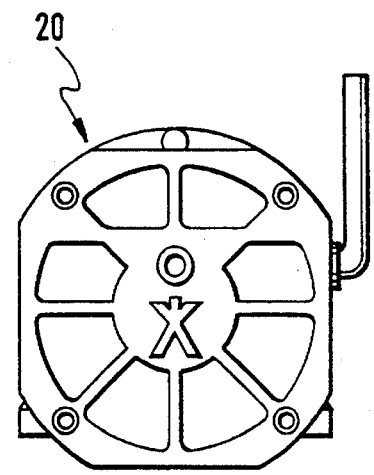
FIG. 5 is an end view of the vacuum pump of FIG. 4.

FIGS. 4 and 5 schematically depict a liquid ring vacuum pump 20 that is used as the evacuating device 5 in certain other preferred embodiments of the invention.

Figure 6:
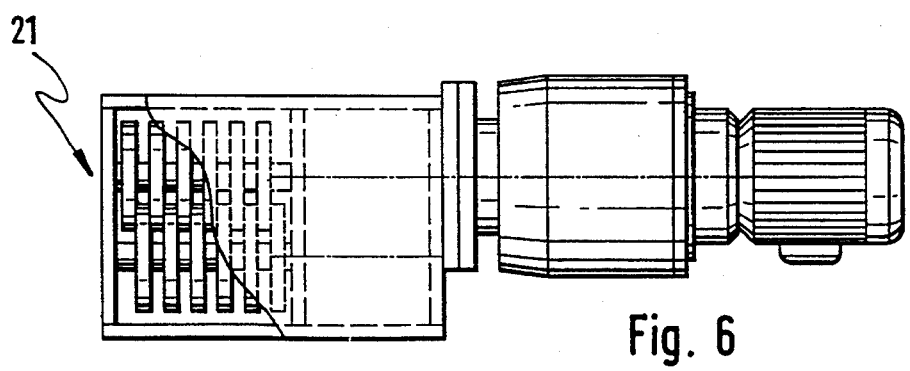
FIG. 6 is a top view of a comminuting device for use with the systems of FIGS. 1 and 2.

FIG. 6 schematically depicts a comminuting device 21 which is placed upstream of the respective reservoir in the cases where large residue is in the liquid media which could retard pumping.

Two further pipe lines 8, 9 are connected to the lower area close to the ground of the return reservoir 1, which each contain a return pump 10, 11 and lead to a collecting tank 12.

A device 13, which detects the level of the media in the return reservoir 1 is disposed therein and has several switch elements 14 reacting to various positions of the level.

Figure 2:
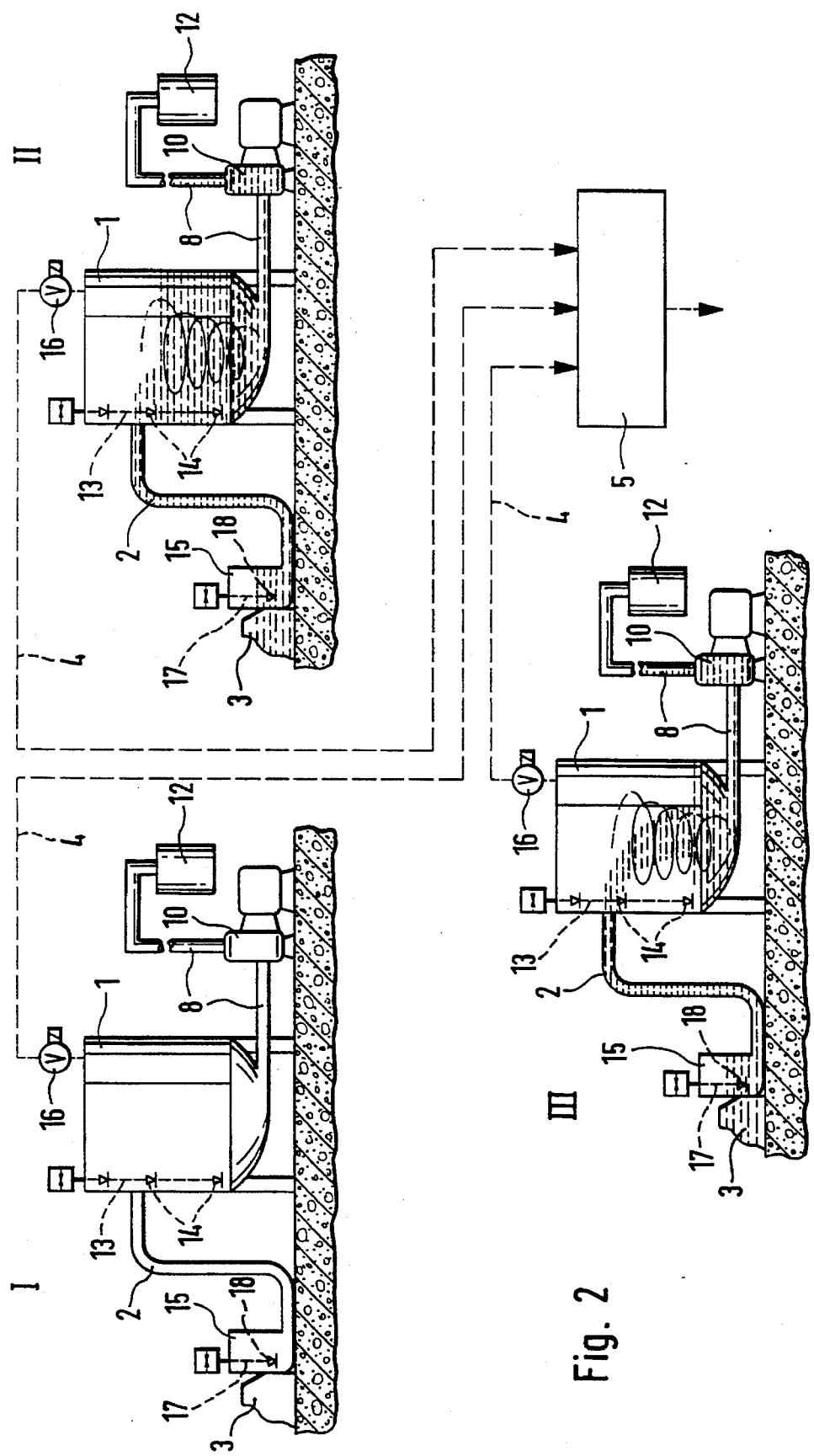
FIG. 2 is a lateral schematic view of a system for the disposal of liquid media with three return reservoirs, constructed according to another preferred embodiment of the invention.

The three units I to III represented in FIG. 2, which each contain a return reservoir and a return pump, are shown in different modes of operation.

An intermediate reservoir 15 is provided in each of the three units I to III, into which a gutter 3, not represented in detail in the drawings, terminates. Each intermediate reservoir 15 is connected by means of a pipe line 2 with the upper area of a return reservoir 1, which is made pressure-proof. Furthermore, pipe lines 4, each of which contains a switchable closing valve 16 and leads to the single evacuating device 5, is connected with the upper area of each return reservoir 1. A pipe line 8 is connected close to the bottom of each return reservoir 1 and leads, respectively via a return pump 10, to a collecting tank, not shown in the drawings.

Furthermore, a device 17 with a switch element 18 detecting the level in each intermediate reservoir 15, is provided in each intermediate reservoir 15, and a device 13 with switch elements 14 is disposed in each return reservoir 1 for detecting the level therein.

The operational state of the unit I is that the intermediate reservoir 15 and the return reservoir 1 are empty, the closing valve 16 is shut and the return pump 10 is switched off.

The operational state of the unit II is that the intermediate reservoir 15 contains a liquid medium which is aspirated into the return reservoir 1. The closing valve 16 is opened and the return pump 10 is switched on.

The operational state of the unit III is that the intermediate reservoir 15 contains a liquid medium which is aspirated into the return reservoir 1, which is to be completely emptied. The closing valve 16 is opened and the return pump 10 is still switched on within the period of the set run-on time.

The switchable closing valves are usefully embodied as magnetic valves.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A liquid media disposal system for cooling/lubricating liquids containing production residue, comprising:

a pressure resistant return reservoir disposed above ground level, a liquid supply pipe line extending between a liquid media collection space located near or below ground level and an upper area of the return reservoir for supplying liquid media to the return reservoir, an evacuating device connected to an upper area of the return reservoir, at least one liquid level detecting device in the return reservoir which controls at least one switch element operating the evacuating device, and at least one outlet pipeline opening into a bottom area of the return reservoir and communicating with a liquid media return pump which pumps liquid media from the return reservoir into a collecting tank.

2. A system according to claim 1, wherein a pressure-limiting valve is inserted between the return reservoir and the evacuating device.

3. A system according to claim 1, wherein a filter is connected downstream of the evacuating device.

4. A system according to claim 1, wherein the evacuating device is embodied as a bypass channel compressor.

5. A system according to claim 1, wherein the evacuating device is embodied as a rotary piston blower.

6. A system according to claim 1, wherein the evacuating device is embodied as a liquid ring vacuum pump.

7. A system according to claim 1, wherein the detecting device controls several of said switch elements reacting to the different positions of the level.

8. A system according to claim 7, wherein two of said outlet pipe lines each containing a return pump are connected to the lower area close to the bottom of the return reservoir and lead to a respective collecting tank.

9. A system according to claim 1, wherein the liquid media is filtered upstream of the liquid supply line.

10. A system according to claim 1, comprising:

a plurality of said return reservoirs with respective upstream gutters, supply pipe lines, liquid media return pumps, and detecting devices for detecting the liquid level in the respective return reservoirs, wherein respective intermediate reservoirs are provided between the respective gutters and supply pipe lines, wherein the return reservoirs are connected in parallel to a single evacuating device, wherein a switchable closing valve is inserted into each pipe line connecting a respective return reservoir with the evacuating device, and wherein a detecting device for detecting the level in each intermediate reservoir and including at least one switch element is provided in each intermediate reservoir.

11. A system according to claim 10, wherein a comminuting device for large-grain production residue is connected upstream of each intermediate reservoir.

* * * * *